Jan. 23, 1968   G. SERVILLAT   3,364,953
COUPLING FOR CONNECTING A HEALD WITH ITS COUNTERWEIGHT
Filed Jan. 5, 1966   2 Sheets-Sheet 2
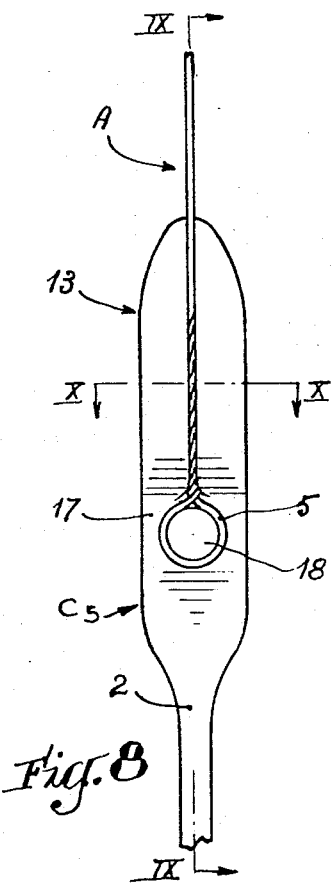
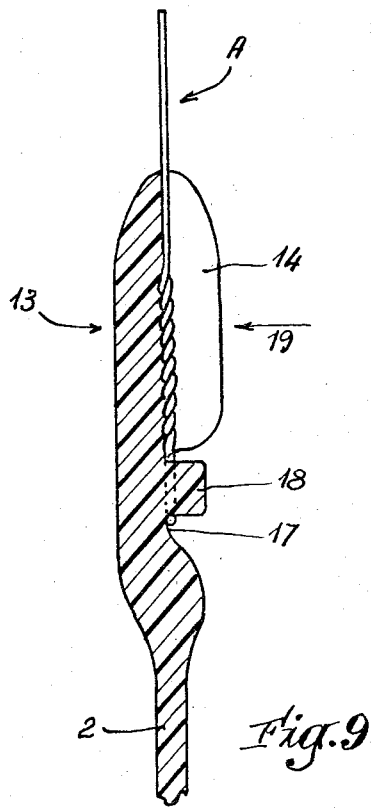
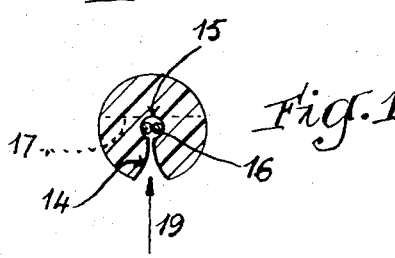
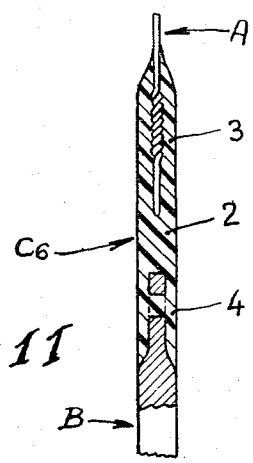
INVENTOR
Gabriel Servillat
BY Alexander ...
ATTORNEYS

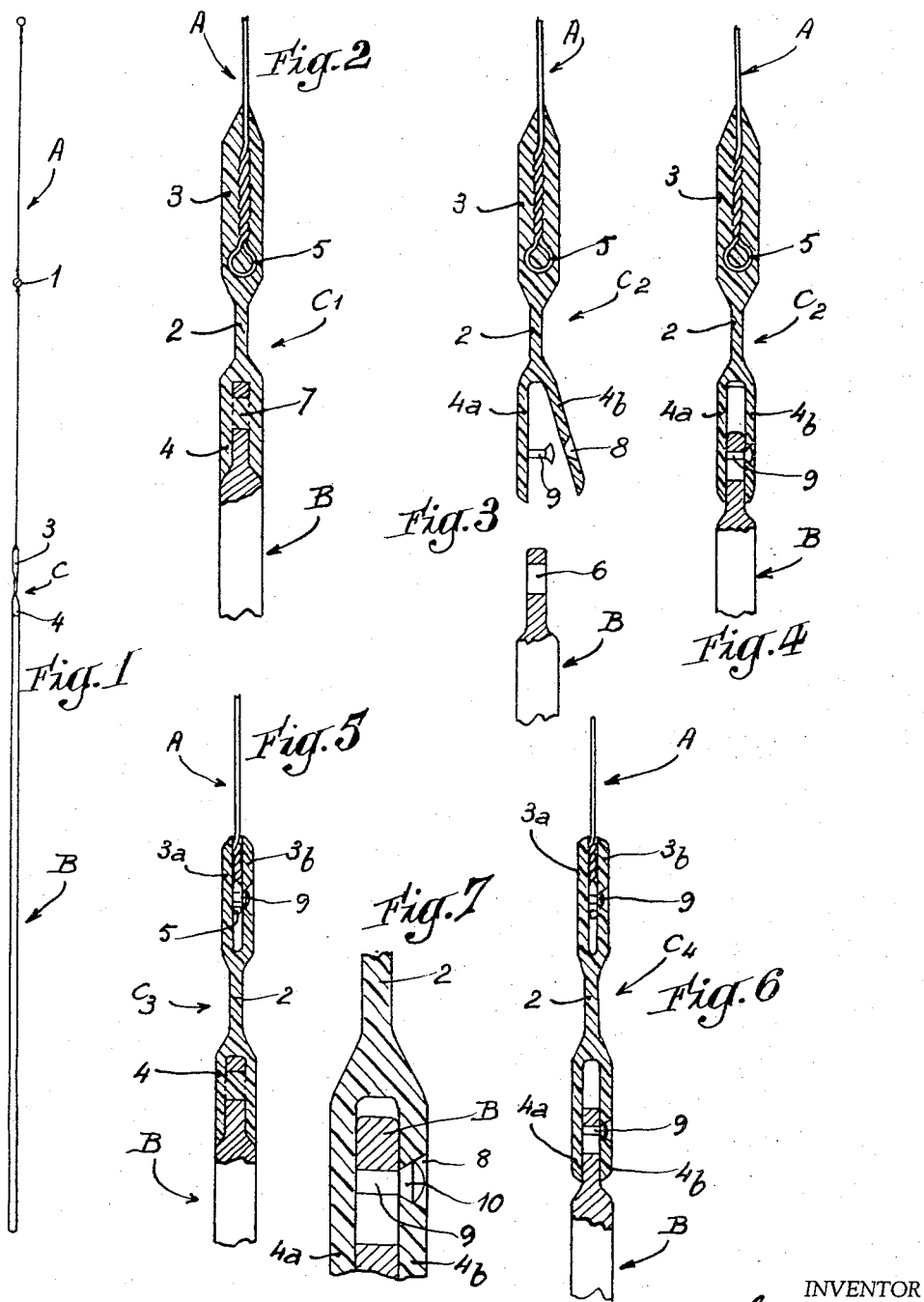

United States Patent Office 3,364,953
Patented Jan. 23, 1968

3,364,953
COUPLING FOR CONNECTING A HEALD
WITH ITS COUNTERWEIGHT
Gabriel Servillat, Saint-Cyr-au-Mont-d'Or, France, assignor to Societe des Mecaniques Verdol, Lyon, France, a French limited-liability company
Filed Jan. 5, 1966, Ser. No. 518,955
Claims priority, application France, June 12, 1965, 45,500, Patent 1,429,450
7 Claims. (Cl. 139—90)

ABSTRACT OF THE DISCLOSURE

The coupling is made integral from a piece of moulded plastic, and has a flexible central portion disposed between two anchorage end portions. Anchorage on the heald and weight may be obtained by injection moulding or by snapping engagement.

Disclosure of invention

The present invention concerns improvements in healds used in the weaving mechanism of power looms and it concerns more particularly a flexible coupling for connecting a heald with its counterweight.

It is known that the healds of a power loom are suspended vertically by their upper ends from members such as hooks, while their lower ends have counterweights. A heald is usually made from thin flexible metallic wire, and a coupling must then be effected to the counterweight which is heavy and rigid. Different methods have been utilized up to the present for effecting the connection of the weight to the heald. Initially a ring was made at the end of the heald, into which a metal link was passed which also engaged a hole provided at the top of the weight. This method of connection is quite satisfactory for slow looms, but it becomes impracticable for the high speeds in use at the present time, since the weight tends to jump relatively to the lower end of the heald and the link becomes positioned transversely, thus causing entanglement with adjacent healds or weights.

In order to prevent this trouble, it is known to fasten the lower end of the heald rigidly to the top of the weight, for example, by soldering, crimping or by otherwise fixing the two parts together. In this way displacement of the weight is prevented, but each heald and its weight constitutes a single item which has one point of least resistance to bending, this being at the level of the junction of the two parts, as a result of the considerable variation of cross-section at this point, which also constitutes a transition between a rigid part and a flexible part. Consequently it often happens that the heald bends in this zone and retains a permanent deformation, which obviously impairs the correct operation of the harness. This deformation can spread from one heald to another, and it is then necessary to effect a complete overhaul of the mechanism.

The object of the present invention is to eliminate these disadvantages by utilising an intermediate coupling having a controlled flexibility, for effecting the connection between each heald and its weight in such a way that the coupling, by bending elastically, prevents damage to the heald and suppresses any tendency of the weight to jolt.

An assembly according to the invention comprises a flexible coupling of plastic material, the body of which is constituted by a central portion capable of bending elastically, terminated at each end by an anchorage system allowing it to be fixed respectively on the lower part of a heald and to the top of a weight. This plastic coupling may be formed by injection moulding so as to enclose the ends of the heald and the weight, or it may be riveted, hooked, or otherwise securely fixed to the heald and weight.

Reference will now be made to the accompanying drawings, in which:

FIG. 1 is a view in elevation of a heald equipped with a coupling in accordance with the invention for anchoring it to its weight.

FIG. 2 is a partial section on an enlarged scale showing a detail of the coupling.

FIG. 3 is an exploded view of an alternative embodiment in accordance with the invention, prior to its installation.

FIG. 4 is a view similar to FIG. 3 after installation.

FIG. 5 shows a further embodiment in accordance with the invention.

FIG. 6 shows a further embodiment in accordance with the invention.

FIG. 7 shows a detail on an enlarged scale of one of the catch members shown in FIGS. 3, 4, 5 and 6.

FIG. 8 is a front view of a further embodiment in accordance with the invention.

FIGS. 9 and 10 are views in section taken respectively on the lines IX—IX and X—X of FIG. 8.

FIG. 11 is a view of another embodiment of the invention.

The heald A shown in FIGS. 1 to 6 comprises an eyelet 1, and it carries a counterweight B from its lower end. The connection of these two elements A and B is effected by a coupling C formed of a flexible material such as plastic material. This coupling may be formed as any one of the various embodiments C1, C2, C3, C4, C5 and C6 shown in FIGS. 1 to 11.

In all cases the coupling C is made from a piece of flexible plastic material and it comprises a flexible central portion 2 disposed between two anchorage end portions 3 and 4. The end portion 3 is fixed rigidly to the lower part of the heald A which is terminated at this point by an eyelet 5. The end portion 4 is solidly anchored on the upper end of the weight B which is flattened and includes a suspension aperture 6.

In this arrangement the heald A with the end portion 3, the weight B, and the end portion 4, are interconnected by the central portion 2 which forms a zone of least resistance to bending. In the event of the application of abnormal acceleration, the central portion 2 bends elastically, after which it returns to its previous form, returning the assembly to its initial position.

The anchoring of the end portions 3 and 4 to the heald A and the weight B may be carried out in different ways.

In the example shown in FIG. 2, the coupling C1 is formed of plastic material moulded directly onto the heald and weight. The eyelet 5 is surrounded by the end portion 3, while the top of the weight B is invested in the plastic material which fills the orifice 6, forming an anchorage tenon 7. The central portion 2 is of reduced thickness.

In accordance with the modification shown in FIG. 3, the coupling C2 is made as before by moulding the end portion 3 in place on the heald A. However, the end portion 4 now comprises two legs 4a and 4b, the second of which is equipped with a transverse hole 8 while the first carries a stem with an enlarged head 9 capable of being forcibly engaged in the said hole 8 in the manner of a press stud.

In order to join the coupling C2 to the weight, the two legs 4a and 4b are separated as shown in FIG. 3, then the stem 9 is passed through the aperture 6 of the weight B. The two legs 4a and 4b are then squeezed together by pressing them on both sides of the flattened portion of the bobbin B, to cause engagement of the stem and head 9 in the hole 8 as shown in FIG. 4. The operation is similar to that of the device C1 shown in FIG. 2, i.e.

the central portion 2 constitutes a zone of least resistance to bending, which deforms in the event of accidental disturbances, whereafter it returns to its normal form, automatically restoring the assembly A–B–C to its initial position.

In accordance with the modification shown in FIG. 5, the end portion 4 of the coupling C3 is moulded in place on the top of the weight B, and it is the end portion 3 which may be squeezed onto or engaged with the lower end of the heald A. The engaging means used may be similar to that above described with respect to the modification C2, i.e. the two legs 3a and 3b of the end portion 3 are joined by a stem with enlarged head 9 on one leg 3a which is forcibly engaged into a hole such as 8 in the other leg 3b after having caused it to pass through through the eyelet 5 of the heald A.

FIG. 6 shows a modification in accordance with the invention in which the flexible coupling is formed independently of the heald A and of the weight B. The two end portions of this coupling may be similar to the end portions, 3a–3b or 4a–4b shown respectively in FIGS. 5 and 4. In this case the heald A, the weight B and the coupling C4 constitute three independent parts which can be assembled on the spot by engaging the stems with enlarged heads 9 in the holes provided for this purpose.

In FIG. 7 there is shown on an enlarged scale a detail of the end portions 4a–4b of the modifications C2 and C4, in such a way as to show a conical enlargement 10 which is provided at the end of the stem 9. This enlargement 10 engages within the hole 8 provided in the leg 4b for this purpose, the edges of the hole being tapered towards the interior of the coupling so as to retain the assembly in place after being put together.

In accordance with the modification C5 shown in FIGS. 8 to 10, the end portion 3 serving to hook on the heald is replaced by an end portion 13. This has a general cylindrical shape, and it is longitudinally split on one side by a radial slit 14 which opens into an axial bore. The slit 14 is provided with a bell-mouthed opening, which facilitates the pressed introduction of the twisted portion 16 of the heald A situated above the eyelet 5. The diameter of the bore 15 is slightly less than that of the theoretical cylinder circumscribing the twisted portion 16, so that this portion is elastically clamped in the end portion 13 after assembly. There is provided at the base of the ferrule 13 a recessed portion bounded by a substantially diametrical face 17 against which the eyelet 5 is located after being assembled. In addition an anchoring stub 18 projects centrally from the face 17, perpendicularly to the latter, and its diameter allows it to be introduced into the eyelet 5.

The assembling of the heald A onto the end portion 13 is effected by pressing the twisted part 16 into the bore 15, as indicated by the arrow 19 (FIG. 10). At the end of this operation the eyelet 5 surrounds the stud 18 which locates it, while the elastic grip of the twisted portion 16 in the bore 15 prevents relative vibration between the heald A and the weight B.

In all the modification C1 to C5 which have been described, the central portion 2 has been of reduced thickness.

Obviously it can have the same diameter as the end portions 3 and 4 (FIG. 11); the device C6 which then results having a substantially cylindrical external appearance.

It should be understood that the modifications described above have only been given by way of example and that they do not limit the scope of the invention. For example, the end portions 3, 4 or their different modifications, 3a–3b–13–4a–4b may be so formed as to have a transverse section which is circular, oval, flattened or polygonal. It is equally possible to replace the enlarged head 9 and/or the holes 8 by any other securing devices of known type. Finally the end portions 3, 13 and/or 14 may be constructed in the form of hollow sockets which are force-fitted onto the ends of the heald A and/or the weight B.

I claim:

1. In a loom harness, a coupling link for interconnecting a heald with its counterweight, said link being formed of an elastic plastic material, said link having an end portion at each end, means securing one end portion to the heald, means securing the other end portion to the counterweight, and having a flexible central portion interconnecting said end portions, said end portions being each moulded into position on its associated part.

2. In a loom harness, a coupling link for interconnecting a heald with its counterweight, said link being formed of an elastic plastic material, said link having an end portion at each end, means for securing one end portion to the heald, means for securing the other end portion to the counterweight, and having a flexible central portion interconnecting said end portions, at least one end portion comprising two flexible legs one having a hole and the other a stem with an enlarged head for engagement in said hole.

3. In a loom harness, a coupling link for interconnecting a heald with its counterweight, said link being formed of an elastic plastic material, said link having an end portion at each end, means securing one end portion to the heald, means securing the other end portion to the conuterweight, and having a flexible central portion interconnecting said end portions, one end portion having two flexible legs one of which has a projection thereon for engagement with a hole in said counterweight.

4. In a loom harness, a coupling link for interconnecting a heald with its counterweight, said link being formed of an elastic plastic material, said link having an end portion at each end, means securing the other end portion to the counterweight, and having a flexible central portion interconnecting said end portions, one end portion being of substantially cylindrical shape, and provided with a longitudinal slit extending radially from an axial bore, a flattened recessed portion in the bore at the inner end thereof, and an anchoring stud projecting from said recessed portion.

5. In a loom harness, a coupling link for interconnecting a heald with its counterweight, said link comprising two end portions each firmly attached to its associated part, and a flexible central portion of lesser cross-section than said end portions interconnecting them, said link being formed of an elastic thermoplastic material.

6. A harness as recited in claim 5, in which said end portions and central portion are of circular cross-section.

7. A heald assembly comprising a heald wire, a link and a counterweight, said link being constructed of thermoplastic material and having two end portions firmly engaging said heald wire and said counterweight respectively, together with a flexible central connecting portion of lesser cross-section than said end portions.

References Cited

UNITED STATES PATENTS

| 2,026,277 | 12/1935 | Hardaker | 139—90 |
| 2,129,940 | 9/1938 | Kaufmann | 139—90 |
| 3,225,408 | 12/1965 | Durham | 24—265 |

FOREIGN PATENTS 544,718  1/1956  Italy.

HENRY S. JAUDON, *Primary Examiner.*